US012749830B2

(12) United States Patent
Mansour et al.

(10) Patent No.: US 12,749,830 B2
(45) Date of Patent: Sep. 29, 2026

(54) SYSTEM AND MULTI-LAYER MIMO ANTENNA

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 223 days.

(21) Appl. No.: 18/237,297

(22) Filed: Aug. 23, 2023

(65) Prior Publication Data

US 2025/0070483 A1 Feb. 27, 2025

(51) Int. Cl.

| | |
|---|---|
| ***H01Q 21/29*** | (2006.01) |
| ***H01Q 1/24*** | (2006.01) |
| ***H01Q 1/42*** | (2006.01) |
| ***H01Q 21/00*** | (2006.01) |

(52) U.S. Cl.

CPC ............ *H01Q 21/29* (2013.01); *H01Q 1/241* (2013.01); *H01Q 1/422* (2013.01); *H01Q 21/0025* (2013.01)

(58) Field of Classification Search

CPC .... H01Q 21/29; H01Q 21/0025; H01Q 1/241; H01Q 1/422

See application file for complete search history.

(56) References Cited

U.S. PATENT DOCUMENTS

| | | | | |
|---|---|---|---|---|
| 9,106,284 | B1 * | 8/2015 | Scott | H04B 7/0689 |
| 12,542,575 | B2 * | 2/2026 | Cho | H04B 1/44 |
| 2018/0034166 | A1 * | 2/2018 | Hinman | H01Q 1/007 |
| 2019/0260457 | A1 * | 8/2019 | Hwang | H04B 7/086 |
| 2022/0140475 | A1 * | 5/2022 | Schober | H01Q 1/38 343/702 |
| 2023/0062464 | A1 * | 3/2023 | Kim | H01Q 21/08 |

(Continued)

FOREIGN PATENT DOCUMENTS

| | | | | |
|---|---|---|---|---|
| CN | 119171080 A * | 12/2024 | | H01Q 1/241 |
| DE | 112015003825 T5 * | 5/2017 | | H01Q 15/0086 |
| JP | 6138795 B2 * | 5/2017 | | |

(Continued)

*Primary Examiner* — Seokjin Kim

(74) *Attorney, Agent, or Firm* — SHOOK, HARDY & BACON L.L.P.

(57) ABSTRACT

Devices and systems for increasing the gain and/or offering multiple antenna frequencies while conserving space on the antenna are provided. According to various aspects of the technology, panels with antenna elements are stacked to create a MIMO antenna array with more antenna elements while conserving space. In some aspects, the antenna elements are the same size and produce the same frequency while their physical configuration increases the gain of the antenna. In alternative aspects, the antenna elements are different sizes and produces different frequencies such that the antenna offers a greater variety or bandwidth of frequencies while conserving physical space on the antenna (i.e., maximizing a total quantity of antenna elements associated with the antenna). Using an antenna system and device with an increased quantity of antenna elements increases one or more of the system capacity, data rates, reliability, gain, coverage range, and the like.

17 Claims, 9 Drawing Sheets

(56) References Cited

U.S. PATENT DOCUMENTS

| | | | | |
|---|---|---|---|---|
| 2024/0405817 | A1* | 12/2024 | Raghavan ............ | H04B 7/0469 |
| 2025/0070484 | A1* | 2/2025 | Mansour ................ | H01Q 21/28 |

FOREIGN PATENT DOCUMENTS

| | | | | |
|---|---|---|---|---|
| WO | WO-2013036231 A1 * | 3/2013 | ........... | H01Q 1/2266 |
| WO | WO-2017166259 A1 * | 10/2017 | ............. | H04B 7/086 |
| WO | WO-2025026564 A1 * | 2/2025 | ......... | H01Q 21/0025 |

* cited by examiner

SYSTEM AND MULTI-LAYER MIMO ANTENNA

TECHNICAL BACKGROUND

The present disclosure generally relates to an antenna device and antenna configurations.

BACKGROUND

By way of background, a traditional multiple-input multiple-output (MIMO) antenna contains radiating elements (e.g., antenna elements) that radiate electromagnetic waves in a particular direction. MIMO antenna arrays conventionally increase gain and enhance overall communication performance by leveraging spatial diversity, beamforming, spatial multiplexing, interference reduction, diversity combining, and increased channel capacity. These techniques collectively lead to better coverage, higher data rates, and improved reliability in wireless communication systems. Although modern MIMO antenna arrays can provide significant performance benefits, they do require additional space for the multiple antennas and associated circuitry. In many applications, designers must strike a balance between the benefits of MIMO and the space that is physically available within an antenna array.

Conventionally, multi-band (e.g., multi-frequency) operation allows a device to communicate over different frequencies, which can be used for various purposes. For example, one frequency band might be used for high-speed data communication, while another band might be used for longer-range, lower-speed communication. By dynamically switching between bands or using multiple bands simultaneously, the device can optimize its performance based on the current conditions and requirements. In the context of MIMO, a multi-band device may use multiple antennas to transmit and receive signals on each frequency band. This can provide the spatial diversity and multiplexing benefits of MIMO, improving the reliability and capacity of the wireless communication. One challenge with multi-band MIMO devices is the increased complexity. Designing and managing a system that can handle multiple frequency bands and multiple antennas requires more advanced hardware and software, and can increase the cost and power consumption of the device. However, the benefits in terms of performance and flexibility can be substantial, making multi-band MIMO an important technology for many wireless communication systems.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

According to various aspects of the technology, panels with antenna elements are stacked to create a MIMO antenna array with more antenna elements while conserving space. In some aspects, the antenna elements are the same size and produce the same frequency while their physical configuration increases the gain of the antenna. In alternative aspects, the antenna elements are different sizes and produces different frequencies such that the antenna offers a greater variety or bandwidth of frequencies while conserving physical space on the antenna (i.e., maximizing a total quantity of antenna elements associated with the antenna). Using an antenna system and device with an increased quantity of antenna elements increases one or more of the system capacity, data rates, reliability, gain, coverage range, and the like.

For the purposes of this specification, layering at least two antennas on top of each other may be considered as a practical solution to increase gain while saving space. In traditional MIMO systems, all antenna elements within an array typically operate at the same frequency. In general, lower-frequency signals are able to travel farther than higher-frequency signals. This is because higher-frequency signals have more energy, which allows them to offer a better signal to UEs but makes them more likely to be absorbed or scattered by obstacles in the environment. Additionally, a high frequency MIMO antenna array tends to have a narrow beamwidth, meaning it covers a smaller angular region. While this can be advantageous for focused communication in specific directions, it can also be a limitation when trying to communicate with multiple users or devices in different directions simultaneously. In some aspects described herein, a hybrid approach that combines antenna elements with different frequencies may be considered as a practical solution.

As such, the present disclosure is directed to methods, systems, devices and computer readable media that increase the gain of a MIMO antenna array. By stacking two antennas with the same size antenna elements, the gain may be increased to two times that of a single antenna while taking up the physical space of a single antenna. Alternatively, by stacking two antennas with different size antenna elements (e.g., multi-band, multi-frequency, etc.), the device can send and receive signals on more than one frequency band, which can be used to optimize performance, mitigate interference, increase throughput, and improve reliability, while saving space.

Accordingly, in a first aspect of the present disclosure a device is provided. In accordance, the MIMO antenna array comprises a first plurality of antenna elements arranged in a first plane and a second plurality of antenna elements arranged in a second plane that is different from the first plane. The first plane is positioned to overlay the second plane to increase the gain of the MIMO antenna array. The device also comprises at least one separation layer that is positioned between the first plane and the second plane, wherein the separation layer is comprised of a dielectric material.

In a second aspect of the present disclosure a multi-input multi-output (MIMO) antenna array with improved gain is provided. The MIMO antenna array comprises a first plurality of antenna elements arranged in a first plane, the first plurality of antenna elements corresponding to a first size. The antenna array further comprises a second plurality of antenna elements arranged in a second plane, the second plurality of antenna elements corresponding to the first size, wherein the second plane is different from the first plane, and wherein the second plane overlays the first plane. The antenna array further comprises at least one separation layer placed between the first plane and the second plane, wherein the separation layer is comprised of a dielectric material.

In yet another aspect, a system is provided. The system comprises a base station and a MIMO antenna array communicatively coupled to the base station. The MIMO antenna array is comprised of a first plurality of antenna elements arranged in a first plane, the first plurality of antenna element corresponding to a first size. The system also comprises a second plurality of antenna elements arranged in a second plane, the second plurality of antenna elements corresponding to the first size, wherein the second plane is different from the first plane and parallel to the first plane. The first plane overlays the second plane and the first plurality of antenna elements have physical dimensions that match physical dimensions of the second plurality of antenna elements. The system also comprises at least one separation layer placed between the first plane and the second plane, wherein the separation layer is comprised of a dielectric material.

In another aspect of the present disclosure a device is provided. In accordance, the MIMO antenna array comprises a first plurality of antenna elements arranged in a first plane, wherein the first plurality of antenna elements are a first size. The device also comprises a second plurality of antenna elements arranged in a second plane that is different from the first plane, wherein the second plurality of antenna elements are a second size that is different from the first size. The first plane is positioned to overlay the second plane. The device also comprises at least one separation layer that is positioned between the first plane and the second plane, wherein the separation layer is comprised of a dielectric material.

In another aspect of the present disclosure a device is provided. In accordance, the device is a MIMO antenna array with multiple frequency capabilities that comprises a first plurality of antenna elements arranged in a first plane, wherein the first plurality of antenna elements correspond to a first size. The device also comprises a second plurality of antenna elements arranged in a second plane, wherein the second plurality of antenna elements are a second size that is different from the first size, wherein the second plane is different from the first plane and parallel to the first plane. The first plane is positioned to overlay the second plane. The device also comprises at least one separation layer that is positioned between the first plane and the second plane, wherein the separation layer is comprised of a dielectric material.

In yet another aspect, a system is provided. The system comprises a base station and a MIMO antenna array communicatively coupled to the base station. The MIMO antenna array is comprised of a first plurality of antenna elements arranged in a first plane, the first plurality of antenna element corresponding to a first size. The system also comprises a second plurality of antenna elements arranged in a second plane, the second plurality of antenna elements corresponding to a second size that is different from the first size. The second plane is different from the first plane and parallel to the first plane, wherein the first plane overlays the second plane, and wherein the first plurality of antenna elements have physical dimensions that are different than physical dimensions of the second plurality of antenna elements. The system also comprises at least one separation layer placed between the first plane and the second plane, wherein the separation layer is comprised of a dielectric material.

BRIEF DESCRIPTION OF THE DRAWINGS

Aspects are described in detail below with reference to the attached drawings figures, wherein.

DETAILED DESCRIPTION

Figure 1:
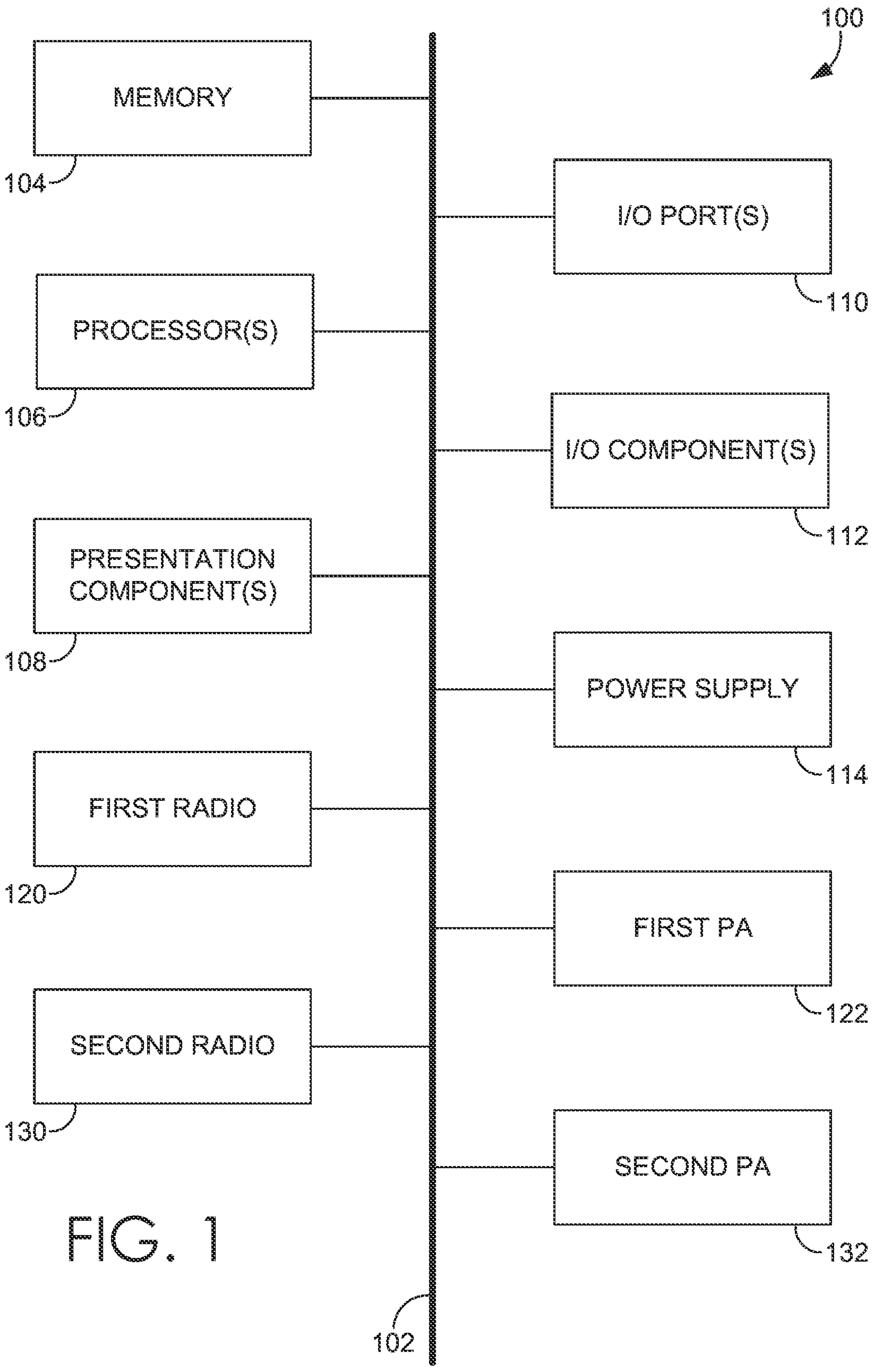
FIG. 1 depicts a simplified diagram of an exemplary computing device, in accordance with one or more aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3G | Third-Generation Wireless Access Technology |
| 4G | Fourth-Generation Wireless Access Technology |
| 5G/5G NR | Fifth-Generation Wireless Access Technology/New Radio |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| CU | Central Unit |
| DU | Distribution Unit |
| EIRP | Equivalent Isotropically Radiated Power |
| eNodeB | Evolved Node B |
| EVDO | Evolution-Data Optimized |
| GIS | Geographic/Geographical/Geospatial Information System |
| gNodeB/ gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communication |
| iDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |
| IIOT | Industry Internet of Things |
| LED | Light Emitting Diode |
| LTE | Long Term Evolution |
| MEC | Mobile Far Edge Computer |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| mmWave | Millimeter Wave |
| NEXRAD | Next-Generation Radar |
| NR | New Radio |
| OOBE | Out-of-Band-Emission |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-&-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 25th Edition (3009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 100 shown in FIG. 1. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device. The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 1 and refer to “computer” or “computing device.”

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
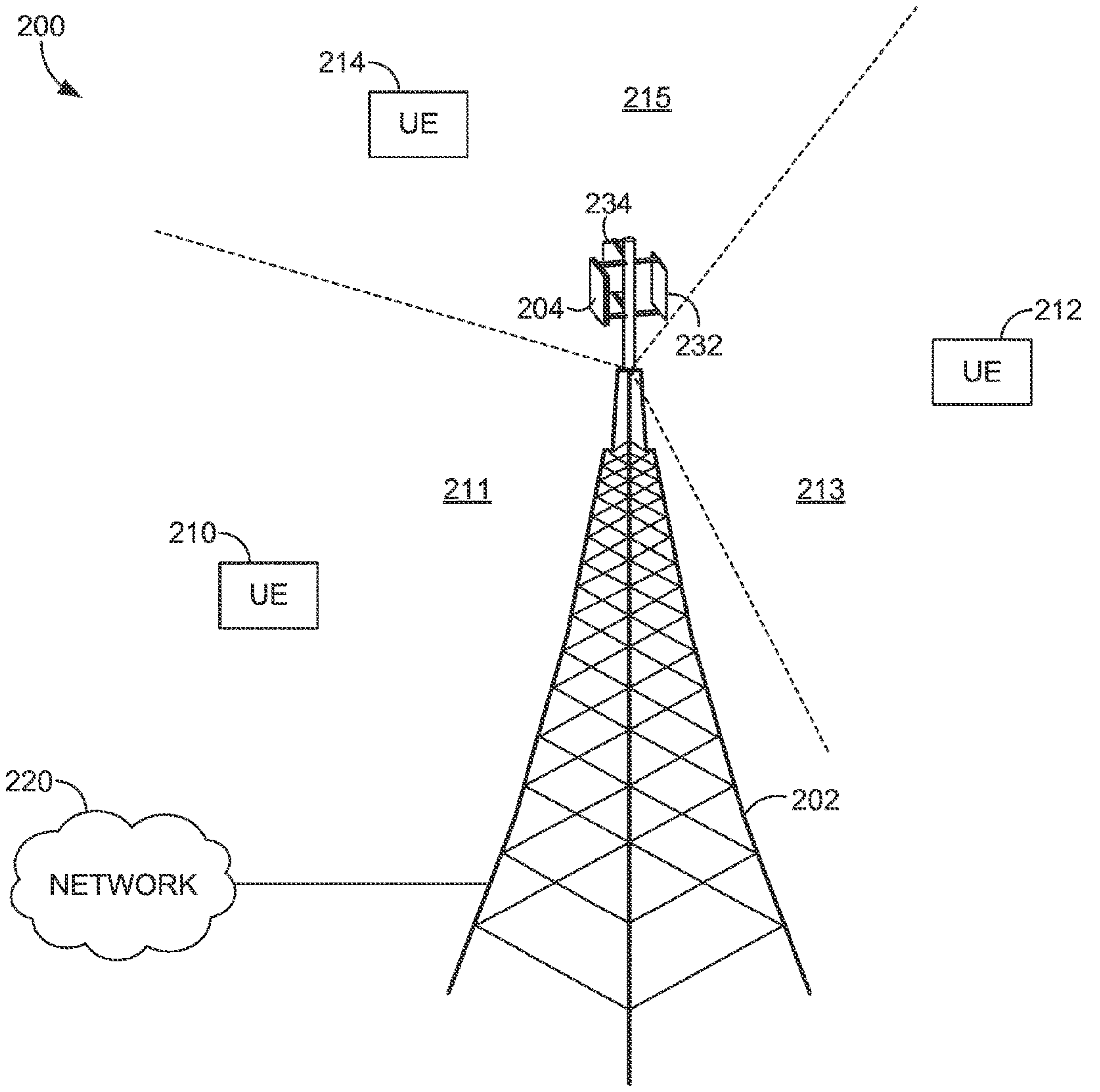
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 generally includes a cell site 202, one or more user devices, and one or more components (not shown) configured to wirelessly communicate between the one or more user devices and a network 220. In the aspect illustrated in FIG. 2, the cell site 202 may comprise a first antenna system 204, a second antenna system 232, and a third antenna system 234. The first antenna system 204 is configured to provide coverage for a first sector 211 while the first antenna system 204 is operating in non-redundant mode, the second antenna system 232 is configured to provide coverage for a second sector 213, and the third antenna system 234 is configured to provide coverage for a third sector 215. In aspects where the cell site 202 comprises more than one antenna system, the antenna systems may be configured to face in different directions and therefore form distinct sectors as coverage areas. For example, FIG. 2 illustrates that when the first antenna system 204 is said to face 0 degrees (0°) relative, then the second antenna system 232 may be said to face 180 degrees (180°) relative and the third antenna system 234 may be said to face 90 degrees (90°) relative.

The network environment 200 includes one or more user devices that are in wireless communication with the cell site 202 via one or more of the first, second, and/or third antenna systems 204, 232, and 234. In an illustrative aspect, a first user device 210 may be disposed in the first sector 211, a second user device 212 may be disposed in the second sector 213, and a third user device 214 may be disposed in the third sector 215 (though many more user devices may be in any sector or a sector may be vacant). In network environment 200, the user device 210, 212, or 214 may take on a variety of forms that communicates via wireless communications with the cell site 202 in order to interact with one or more components of the network 220. Each of the first user device 210, the second user device 212, and/or the third device 214 may be configured to wirelessly communicate using any one or more wireless communication protocols (e.g., 5G, 4G, and the like).

In some cases, the first, second, and/or third user devices 210, 212, and 214 in network environment 200 can optionally utilize network 220 to communicate with each other and/or other devices (e.g., a mobile device(s), a server(s), a personal computer(s), etc.) through the one or more components associated with the cell site 202. The network 220 may be a telecommunications network(s), or a portion thereof that connects subscribers to their immediate service provider. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 220 can include multiple networks, as well as being a network of networks, but is shown in more simple form so as to not obscure other aspects of the present disclosure.

In some instances, network 220 can be associated with a telecommunications provider that provides services (e.g., voice, data, SMS) to user devices, such as user devices 210, 212, or 214. For example, network 220 may provide voice, SMS, and/or data services to user devices or corresponding users that are registered or subscribed to utilize the services provided by a telecommunications provider.

Figure 3A:
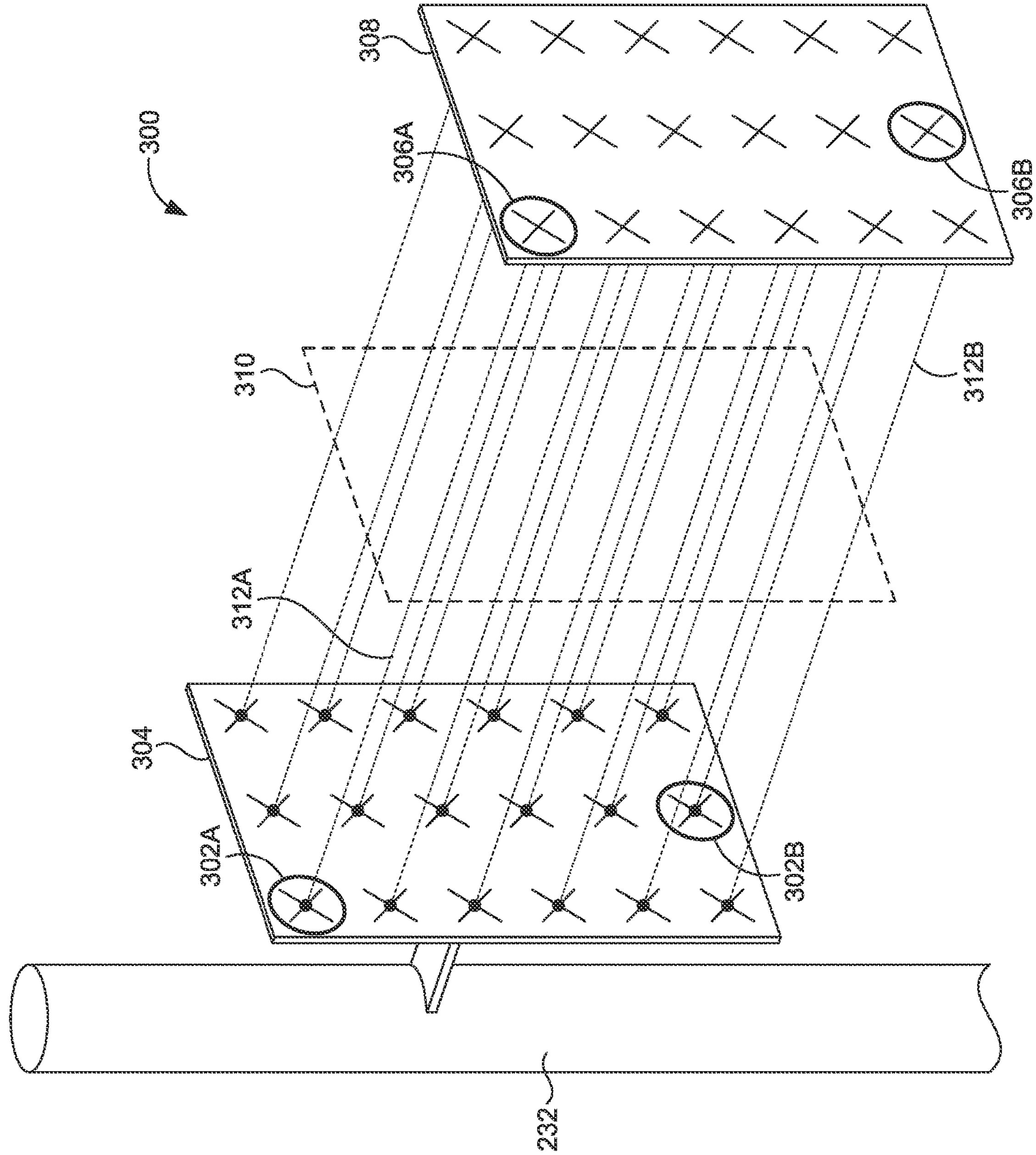
FIG. 3A depicts a simplified exploded-view diagram of an example antenna array with alignment of multiple antenna elements between multiple layers, in accordance with aspects.

Turning now to FIG. 3A, a simplified exploded-view diagram of an example antenna array with alignment of multiple antenna elements between multiple layers, in accordance with aspects. The antenna array 300 can operate within the network 220 of FIG. 2 to provide services, such as voice, data, text, and the like, in various aspects. The antenna array 300 can be a multi-input multi-output (MIMO) antenna array, for example, such as the second antenna system 232 from FIG. 2, in aspects. In various aspects, the antenna array 300 comprises a first plurality of antenna elements 302A and 302B (e.g., individual antenna elements 302A and 302B within the first plurality of antenna elements) arranged in a first plane 304. For brevity, the individual antenna elements 302A and 302B are discussed, although the quantity, placements, and configurations are illustrated as examples only, and other quantity, placements (e.g., rows, columns, patterns, alignments, and the like), and physical and/or hardware configurations are contemplated to be within the scope of this disclosure.

The first plurality of antenna elements corresponds to a first size. The first size is defined by the physical size and dimensions of the radiating element itself, such as length, width, and/or other physical characteristic of the radiating element, which correspond to and/or are determinative of the frequencies that the radiating element is able to produce when in operation, in an array. As such, the size of an antenna element (used interchangeably with the term "radiating element" for simplicity) can be discussed herein in terms of physical size, the frequencies it is capable of producing, or both. For example, a first size of an antenna element could be capable of producing one or more frequencies or frequency ranges between 700 MHz to 2600 MHz. In aspects, at least a portion of antenna elements in the first plurality of antenna elements, such as individual antenna elements 302A and 302B (circled as shown) are communicatively connected (e.g., connected by hardware and/or circuitry, either directly or indirectly, for example, in series) to at least another portion of antenna elements in the first plurality to form one or more groups within the first plane 304.

The antenna array 300 further comprises a second plurality of antenna elements, such as individual antenna elements 306A and 306B (circled as shown), arranged in a second plane 308 that is different from the first plane 304. In various aspects, the second plane 308 is positioned to overlay the first plane 304, or alternatively, the first plane 304 may be positioned to overlay the second plane 308 (not shown), which as further discussed in detail hereinafter increases the gain (e.g., total or overall gain for a particular corresponding frequency range; gain within that particular corresponding sector) of the antenna array 300. In various aspects, the second plurality of antenna elements (i.e., individual antenna elements 306A and 306B are discussed herein as examples within the second plurality) correspond to the first size. As such that each of the second plurality of antenna elements 306A and 306B and each of the first plurality of antenna elements (i.e., individual antenna elements 302A and 302B are discussed herein as examples within the first plurality) are the same or similar size, physically. Based on this same or similar size, the second plurality of antenna elements 306A and 306B will exhibit or provide the same or similar frequency range(s) as the first plurality of antenna elements 302A and 302B.

Figure 3B:
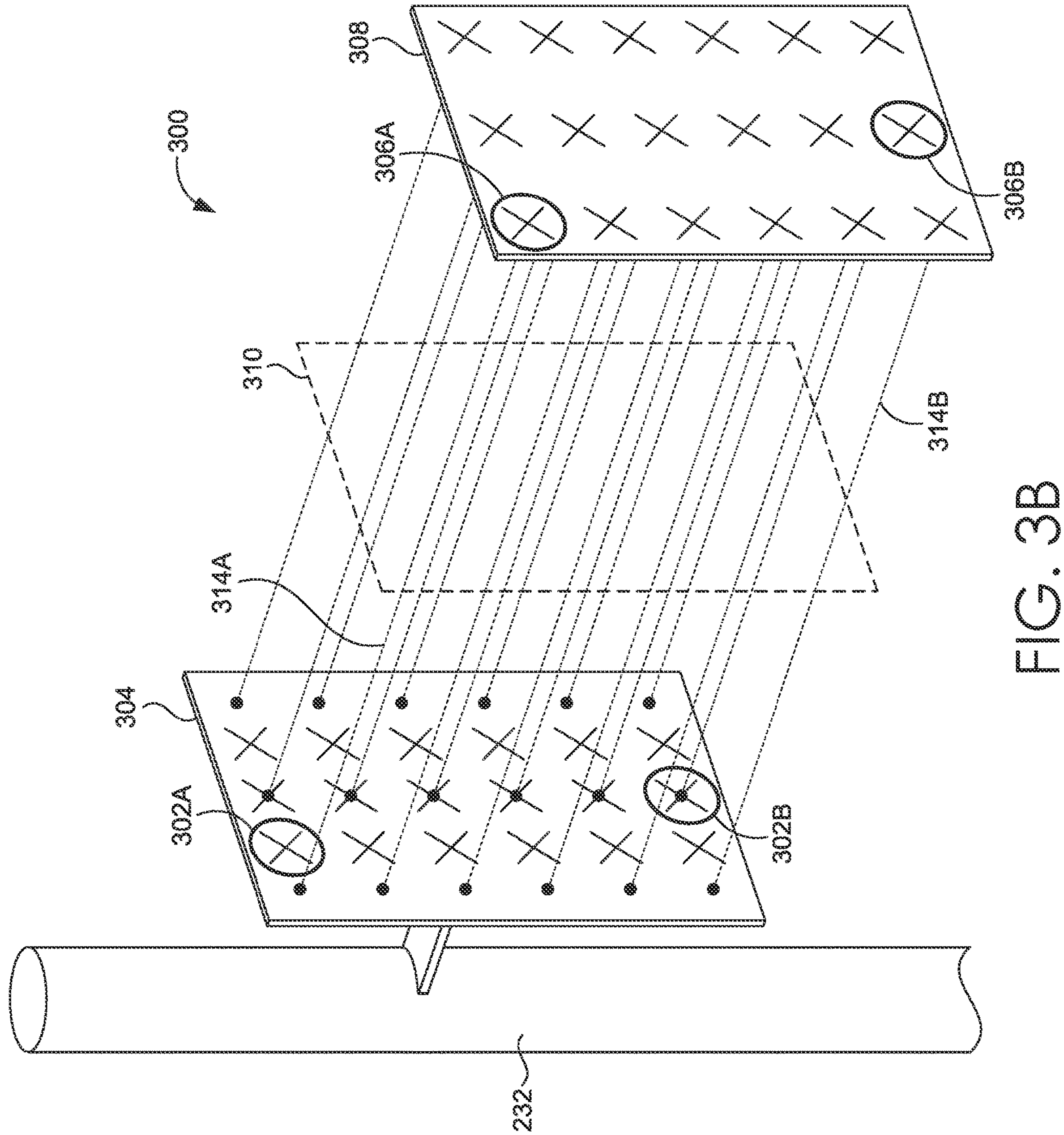
FIG. 3B depicts a simplified exploded-view diagram of an example antenna array with partial alignment of multiple antenna elements between multiple layers, in accordance with aspects.
Figure 3C:
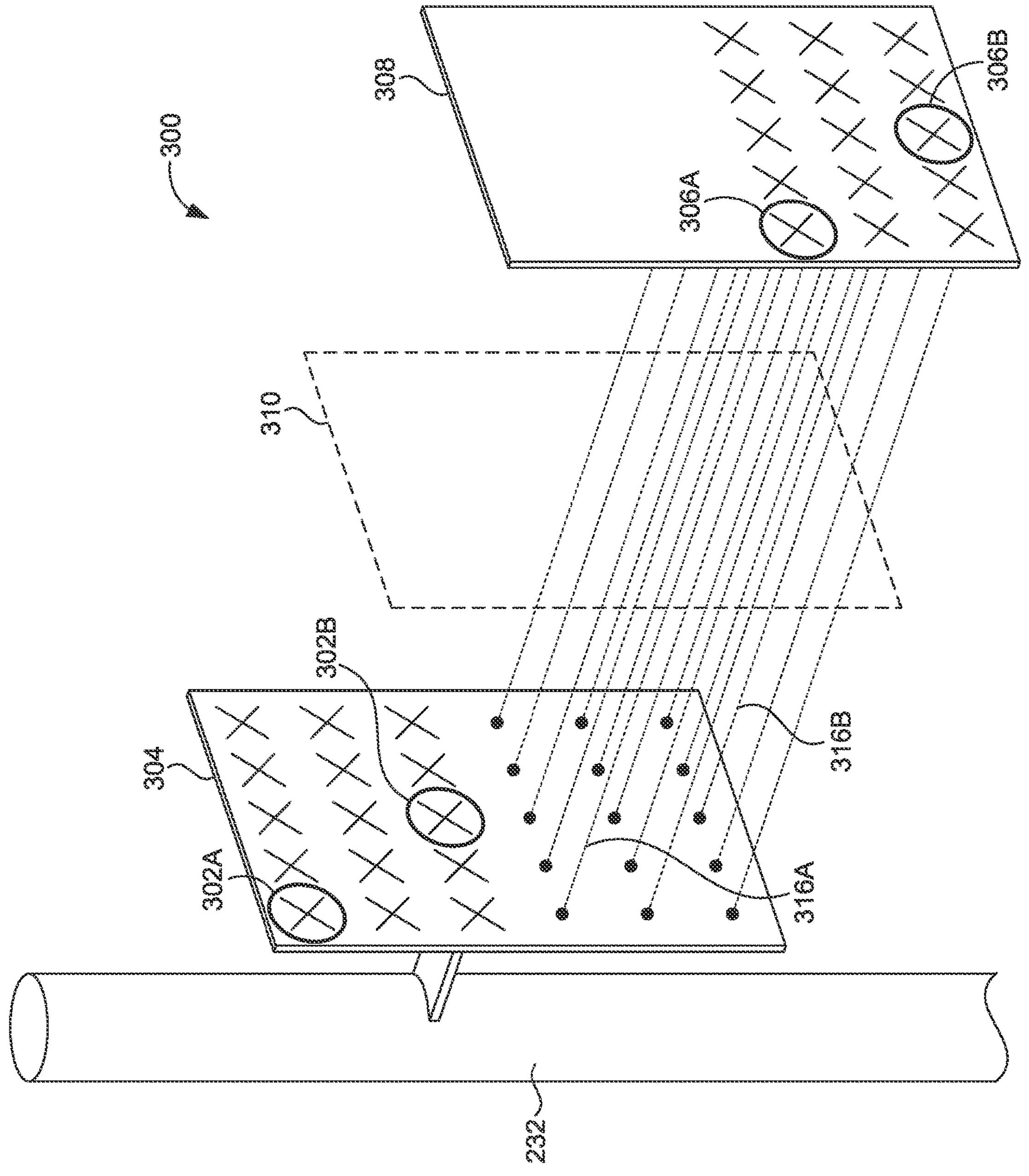
FIG. 3C depicts a simplified exploded-view diagram of an example antenna array with misalignment of multiple antenna elements between multiple layers, in accordance with aspects.

The antenna array 300 comprises at least one separation layer 310 that is positioned in a corresponding third plane, between the first plane 304 and the second plane 308, wherein the separation layer 310 is comprised of a dielectric material. An example of dielectric material is polytetrafluoroethylene. For brevity, the quantity, alignment, thickness, and materials illustrated and discussed regarding the separation layer 310 are examples only, and other characteristics are contemplated to be within the scope of this disclosure. As shown in FIGS. 3A, 3B, and 3C, the first plane 304 is parallel to the second plane 308 and the separation layer 310, such that the first plane 304, second plane 308, and the separation layer 310 in the corresponding third plane are stacked. In aspects, the second plane 308 overlays the first plane 304, or vice versa, such that a position of at least one individual antenna element in the first plurality of antenna elements is arranged in the first plane 304 to align (e.g., when the layers are stacked upon each other) with a position of at least one other corresponding individual antenna element in the second plurality of antenna elements 306A and 306B arranged in the second plane 308. For example, each of the antenna elements 302A and 302B align with corresponding antenna elements 306A and 306B, such that these antenna elements are centered over one another in their respective planes, as depicted by the dashed lines 312A and 312B showing hypothetical alignment axes.

In an alternative, FIG. 3B depicts a simplified exploded-view diagram of an example antenna array 300 with partial alignment of multiple antenna elements between multiple layers, in accordance with aspects. In various aspects, the first plane 304 is parallel to the second plane 308 and the separation layer (i.e., dielectric layer) 310, such that the first plane 304, second plane 308, and the dielectric layer 310 are stacked. In aspects, the first plane 304 overlays the second plane 308, or vice versa, such that a position of at least one individual antenna element in the first plurality of antenna elements is arranged in the first plane 304 to be misaligned with a position of at least one other corresponding individual antenna element in the second plurality of antenna elements arranged in the second plane 308. For example, the antenna element 302B aligns with corresponding antenna element 306B, such that the antenna elements are centered over on another in their respective planes, as depicted by the dashed line 314B showing a hypothetical alignment axis. However, the antenna element 302A is misaligned with corresponding antenna element 306A, such that the antenna elements are not centered over on another in their respective planes, as depicted by the dashed line 314A showing a hypothetical misalignment axis.

In yet another example, FIG. 3C depicts a simplified exploded-view diagram of an example antenna array with misalignment of multiple antenna elements between multiple layers, in accordance with aspects herein. Similar to FIGS. 3A and 3B, the first plane 304 is parallel to the second plane 308 and the dielectric layer 310 in the third plane, such that the first plane 304, second plane 308, and the dielectric layer 310 are stacked. In aspects, the first plane 304 overlays the second plane 308 such that a position of at least each individual antenna element in the first plurality of antenna elements is arranged in the first plane 304 to be misaligned with a position of an individual corresponding antenna element in the second plurality of antenna elements arranged in the second plane 308. For example, the antenna element 302A misaligns with corresponding antenna element 306A, such that the antenna elements are not centered over on another in their respective planes, as depicted by the dashed line 316A showing a hypothetical misalignment axis. Furthermore, the antenna element 302B is also misaligned with corresponding antenna element 306B, such that the antenna elements are not centered over on another in their respective planes, as depicted by the dashed line 316A showing a hypothetical misalignment axis.

Figure 3D:
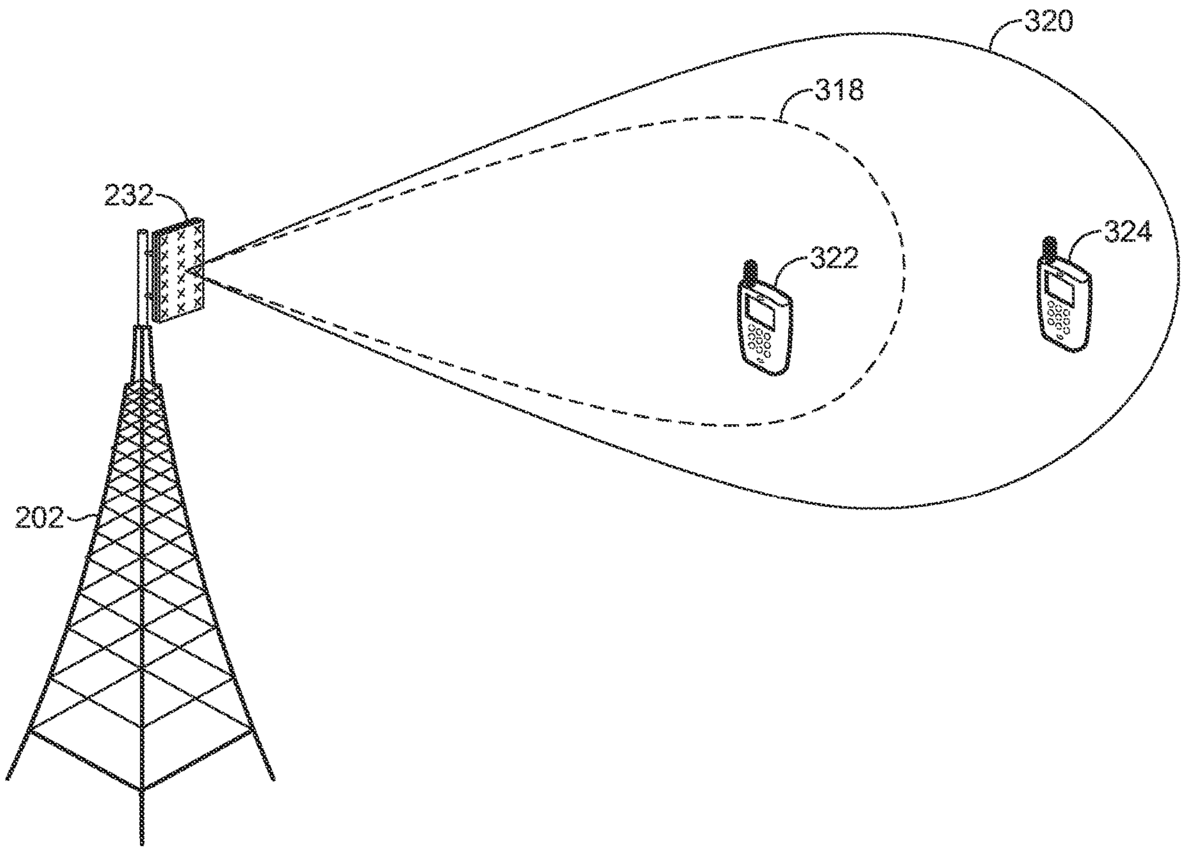
FIG. 3D depicts a simplified diagram of an example antenna array with example radiation patterns based on alignment or misalignment of antenna elements between multiple layers, in accordance with aspects.

FIG. 3D depicts a simplified diagram of an example antenna array with example radiation patterns based on alignment or misalignment of antenna elements of the same size (e.g., frequency) between multiple layers, in accordance with aspects. When the first plane 304 (as shown in FIGS. 3A-3C) is the only plane activated, it has a signal range depicted by 318, in this example. The first UE 322 is in the coverage area, but the second UE 324 may be at or beyond the cell edge of the first coverage area 318. Based on a determination using one or more factors (i.e., the second UE 324 is at or beyond the cell edge, low throughput, based on one or more KPIs being below a predetermined threshold, etc.), the second plurality of antenna elements is activated concurrently with the first plurality of antenna elements, causing the signals to propagate beyond the first coverage area 318 to form the second coverage area 320. By activating the second plurality of antenna elements concurrently with the first plurality of antenna elements, the gain of the antenna array is increased and an improved RF condition for the second UE 320 is provided, allowing the second UE 320 to either attach or simply have a better wireless connection to the base station 202 and network 220.

Additional Embodiments

Figure 4A:
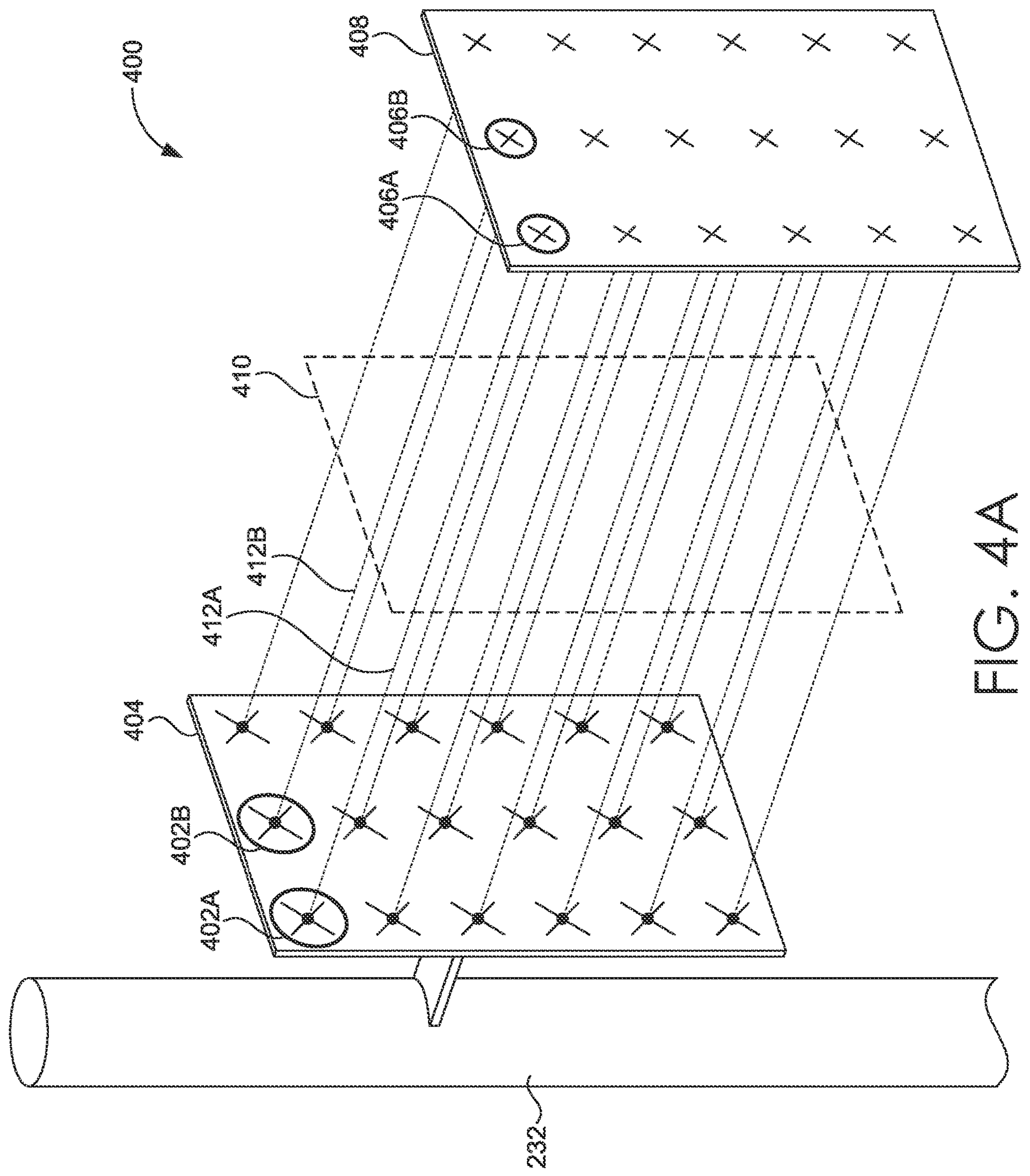
FIG. 4A depicts a simplified exploded-view diagram of an example antenna array with multiple antenna elements of varying sizes by layer, in accordance with aspects.

Turning now to FIG. 4A, a simplified exploded-view diagram of an example antenna array with multiple antenna elements of varying sizes by layer, in accordance with aspects. The antenna array 400 can operate within the network 220 of FIG. 2 to provide services, such as voice, data, text, and the like, in various aspects. The antenna array 400 can be a multi-input multi-output (MIMO) antenna array, for example, such as the second antenna system 232 from FIG. 2. In various aspects, the antenna array 400 comprises a first plurality of antenna elements 402A and 402B (e.g., individual antenna elements 402A and 402B within the first plurality of antenna elements) arranged in a first plane 404. For brevity, the individual antenna elements 402A and 402B are discussed, although the quantity, placements, and configurations are illustrated as examples only, and other quantity, placements (e.g., rows, columns, patterns, alignments, and the like), and physical and/or hardware configurations are contemplated to be within the scope of this disclosure.

The first plurality of antenna elements corresponds to a first size. The first size is defined by the physical size and dimensions of the radiating element itself, such as length, width, and/or other physical characteristic of the radiating element, which correspond to and/or are determinative of the frequencies that the radiating element is able to produce when in operation, in an array. As such, the size of an antenna element (used interchangeably with the term "radiating element" for simplicity) can be discussed herein in terms of physical size, the frequencies it is capable of producing, or both. Examples of a first size for an antenna element in a MIMO array could be 700 MHz, which would be considered a low frequency antenna element in this example and would therefore have a larger size antenna element (i.e., as physical size of an antenna element increases, frequency lowers; and vice versa). In aspects, at least a portion of antenna elements in the first plurality of antenna elements, such as individual antenna elements 402A and 402B (circled as shown) are communicatively connected (e.g., connected by hardware and/or circuitry, either directly or indirectly, for example, in series) to at least another portion of antenna elements in the first plurality to form one or more groups within the first plane 404.

The antenna array 400 further comprises a second plurality of antenna elements, such as individual antenna elements 406A and 406B (circled as shown), arranged in a second plane 408 that is different from the first plane 404. In various aspects, the second plane 408 is positioned to overlay the first plane 404, which as further discussed in detail hereinafter conserves space on the antenna array 400. In various aspects, the second plurality of antenna elements (i.e., individual antenna elements 406A and 406B are discussed herein as examples within the second plurality) correspond to a second size that is distinct or different from the first size. As such, each of the second plurality of antenna elements 406A and 406B may be the same size relative to each other, and each of the first plurality of antenna elements (i.e., individual antenna elements 402A and 402B are discussed herein as examples within the first plurality) may be the same size relative to each other, but the second plurality of antenna elements may be different in size from the first plurality of antenna elements, physically, which correlate to a different size frequency band. Examples of a second size for an antenna element in a MIMO array could be 2600 MHz, which would be considered a high frequency antenna element in this example and would therefore have a smaller sized antenna element than the first plurality of antenna elements. In some aspects, the second plane 408 may have more or less antenna elements 406A and 406B than the first plane 404. Based on the different sizes and/or different quantity of antenna elements, the second plurality of antenna elements 406A and 406B may exhibit or provide different frequency range(s) than the first plurality of antenna elements 402A and 402B. In alternative aspects, the second plurality of antenna elements may correlate with the lower frequency band and the first plurality of antenna elements may correlate with the higher frequency band. The terms low, high, lower, and higher are used for simplicity and merely to differentiate between the frequency and/or frequency ranges produced by the first and second pluralities of antenna elements relative to each other.

Figure 4B:
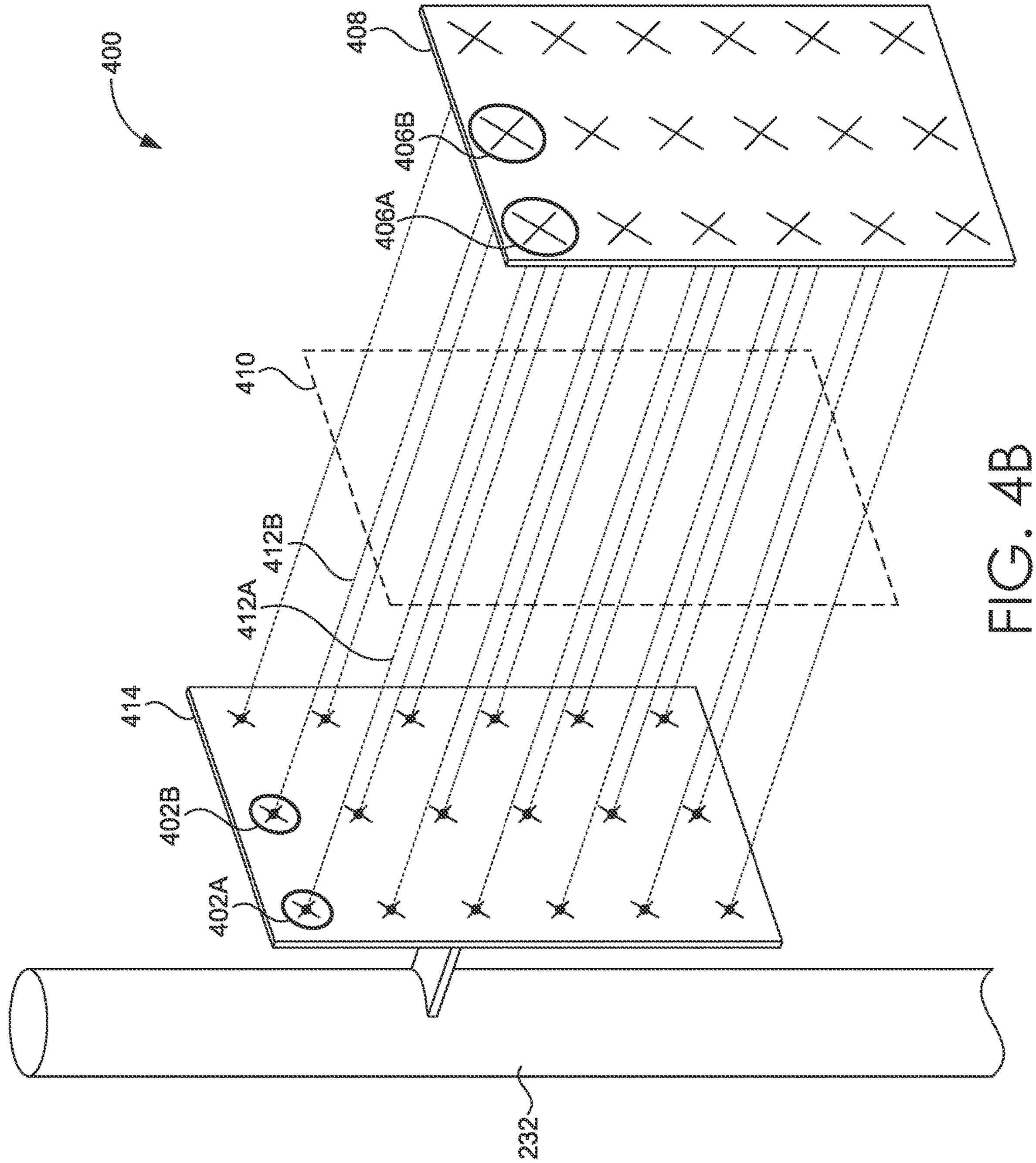
FIG. 4B depicts a simplified exploded-view diagram of an example antenna array with multiple antenna elements of varying sizes by layer, in accordance with aspects.

The antenna array 400 comprises at least one separation layer 410 that is positioned in a corresponding third plane, between the first plane 404 and the second plane 408, wherein the separation layer 410 is comprised of a dielectric material. An example of dielectric material is polytetrafluoroethylene. For brevity, the quantity, alignment, thickness, and materials illustrated and discussed regarding the separation layer 410 are examples only, and other characteristics are contemplated to be within the scope of this disclosure. As shown in FIGS. 4A and 4B, the first plane 404 is parallel to the second plane 408 and the separation layer 410, such that the first plane 404, second plane 408, and the separation layer 410 in the corresponding third plane are stacked. In aspects, the second plane 408 overlays the first plane 404, such that a position of at least one individual antenna element in the first plurality of antenna elements is arranged in the first plane 404 to align with a position of at least one other corresponding individual antenna element in the second plurality of antenna elements arranged in the second plane 408. For example, each of the antenna elements 402A and 402B align with corresponding antenna elements 406A and 406B, such that the antenna elements are centered over on another in their respective planes, as depicted by the dashed lines 412A and 412B showing hypothetical alignment axes. Alternatively, the first plane 404 may overlay the second plane 408 such that a position of each individual antenna element in the first plurality of antenna elements is arranged in the first plane 404 to align with a position of an individual corresponding antenna element in the second plurality of antenna elements arranged in the second plane 408. Alternatively, the antenna elements 402A and 402B may partially overlap with antenna elements 406A and 406B to share one or more frequencies. Alternatively, the antenna elements 402A and 402B may not overlap with antenna elements 406A and 406B.

In an alternative, FIG. 3B depicts a simplified exploded-view diagram of an example antenna array 400 with multiple antenna elements of varying sizes by layer, in accordance with aspects. In various aspects, the first plane 404 now corresponds to the smaller frequency antenna elements and is parallel to the second plane 408 that now corresponds to the larger frequency antenna elements. Accordingly, the first plane 404, second plane 408, and the separation layer 410 are stacked. In aspects, the second plane 416 overlays the first plane 414 such that a position of at least one individual antenna element in the first plurality of antenna elements is arranged in the first plane 414 to align with a position of at least one other corresponding individual antenna element in the second plurality of antenna elements arranged in the second plane 416. Similar to FIG. 4A, each of the antenna elements align with corresponding antenna elements, such that the antenna elements are centered over on another in their respective planes, as depicted by the dashed lines showing hypothetical alignment axes.

Figure 4C:
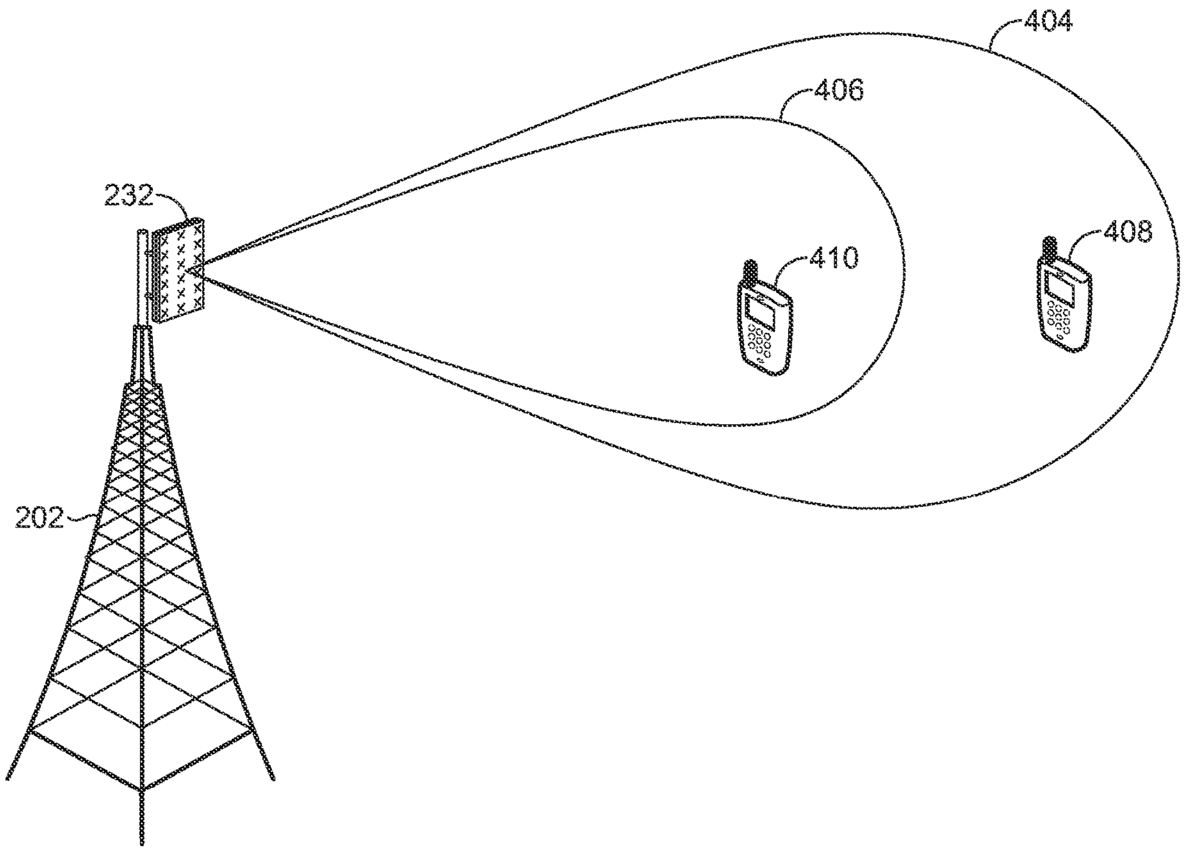
FIG. 4C depicts a simplified diagram of an example antenna array with example radiation patterns based on varying sizes of antenna elements between multiple layers in accordance with aspects.

FIG. 4C depicts a simplified diagram of an example antenna array with example radiation patterns based on varying sizes of antenna elements between multiple layers, in accordance with aspects. Under a first condition, a high frequency antenna is being operated as a matter of course and a plurality of UEs within the area are being served by the antenna system 232 (from FIG. 2) with the high frequency antenna. In aspects, the plurality of UEs being served includes a first UE 410 and a second UE 408. The first UE 410 is within a high frequency coverage area 406 and is capable of having good performance in the high frequency system 406. However, the second UE 408 is beyond the cell edge of the high frequency system 406. Due to threshold or low performance of the second UE 408 using the high frequency system 406, a second panel with a low frequency antenna may be activated, providing a low frequency coverage area 404 that is larger than the high frequency coverage area 406. In this example, the term "activated" can mean that the connection of the second UE 408 switches over from the high frequency panel to the low frequency panel. In aspects, the first UE 410 is still connected to the high frequency panel because it is in the high frequency coverage area 406, which provides better overall performance for the first UE 410.

Under a second condition (in contrast to the first condition discussed hereinabove), both the high frequency antenna panel and the low frequency antenna panel are concurrently available for the plurality of UEs being served. The high frequency panel may be for higher priority devices that are determined based on certain factors and the UEs that are not considered higher priority may only connect to the low frequency antenna panel in aspects. In other aspects, the first UE 410 may be connected to both the high frequency panel and the low frequency panel via carrier aggregation. By stacking the high frequency panel and the low frequency panel, space is saved on the antenna tower and multiple frequencies or ranges are concurrently provided to various UE, for example, as service layers.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A multi-input multi-output (MIMO) antenna array comprising:

a first plurality of antenna elements arranged in a first plane;

a second plurality of antenna elements arranged in a second plane that is different from the first plane, wherein the first plane is positioned to overlay the second plane to increase gain of the MIMO antenna array; and at least one separation layer that is positioned between the first plane and the second plane, wherein the at least one separation layer is comprised of a dielectric material, wherein the first plurality and the second plurality of antenna elements are concurrently powered on within a same operating frequency band and wherein, based on a predetermined threshold, the second plurality of antenna elements is activated concurrently with the first plurality of antenna elements.

2. The antenna array of claim 1, wherein the dielectric material includes polytetrafluoroethylene.

3. The antenna array of claim 1, wherein at least a portion of antenna elements in the first plurality of antenna elements are connected to at least another portion of antenna elements in the first plurality to form one or more groups.

4. The antenna array of claim 1, wherein the first plane is parallel to the second plane, and wherein the first plane overlays the second plane such that a position of at least one individual antenna element in the first plurality of antenna elements is arranged in the first plane to align with a position of at least one other corresponding individual antenna element in the second plurality of antenna elements arranged in the second plane.

5. The antenna array of claim 1, wherein the first plane is parallel to the second plane, and wherein the first plane overlays the second plane such that a position of each individual antenna element in the first plurality of antenna elements is arranged in the first plane to align with a position of an individual corresponding antenna element in the second plurality of antenna elements arranged in the second plane.

6. The antenna array of claim 1, wherein the first plane is parallel to the second plane, and wherein the first plane overlays the second plane such that a position of at least one individual antenna element in the first plurality of antenna elements is arranged in the first plane to be misaligned with a position of at least one other corresponding individual antenna element in the second plurality of antenna elements arranged in the second plane.

7. The antenna array of claim 1, wherein the first plane is parallel to the second plane, and wherein the first plane overlays the second plane such that a position of each individual antenna element in the first plurality of antenna elements is arranged in the first plane to be misaligned with a position of an individual corresponding antenna element in the second plurality of antenna elements arranged in the second plane.

8. A multi-input multi-output (MIMO) antenna array with improved gain, the MIMO antenna array comprising:

a first plurality of antenna elements arranged in a first plane, the first plurality of antenna elements corresponding to a first size;

a second plurality of antenna elements arranged in a second plane that is different from the first plane and parallel to the first plane, the second plurality of antenna elements corresponding to the first size, wherein the first plane overlays the second plane; and at least one separation layer placed between the first plane and the second plane, wherein the separation layer is comprised of a dielectric material, wherein the first plurality and the second plurality of antenna elements are concurrently powered on within a same operating frequency band and wherein, based on a predetermined threshold, the second plurality of antenna elements is activated concurrently with the first plurality of antenna elements.

9. The antenna array of claim 8, wherein the dielectric material includes polytetrafluoroethylene.

10. The antenna array of claim 8, wherein at least a portion of antenna elements in the first plurality of antenna elements are connected to at least another portion of antenna elements in the first plurality to form one or more groups.

11. The antenna array of claim 8, wherein the first plane is parallel to the second plane, and wherein the first plane overlays the second plane such that a position of at least one individual antenna element in the first plurality of antenna elements is arranged in the first plane to align with a position of at least one other corresponding individual antenna element in the second plurality of antenna elements arranged in the second plane.

12. The antenna array of claim 8, wherein the first plane is parallel to the second plane, and wherein the first plane overlays the second plane such that a position of each individual antenna element in the first plurality of antenna elements is arranged in the first plane to align with a position of an individual corresponding antenna element in the second plurality of antenna elements arranged in the second plane.

13. The antenna array of claim 8, wherein the first plane is parallel to the second plane, and wherein the first plane overlays the second plane such that a position of at least one individual antenna element in the first plurality of antenna elements is arranged in the first plane to be misaligned with a position of at least one other corresponding individual antenna element in the second plurality of antenna elements arranged in the second plane.

14. The antenna array of claim 8, wherein the first plane is parallel to the second plane, and wherein the first plane overlays the second plane such that a position of each individual antenna element in the first plurality of antenna elements is arranged in the first plane to be misaligned with a position of an individual corresponding antenna element in the second plurality of antenna elements arranged in the second plane.

15. A system comprising:

a base station; and a multi input multi output (MIMO) antenna array communicatively coupled to the base station, the MIMO antenna array comprised of:

a first plurality of antenna elements arranged in a first plane, the first plurality of antenna element corresponding to a first size;

a second plurality of antenna elements arranged in a second plane, the second plurality of antenna elements corresponding to the first size, wherein the second plane is different from the first plane and parallel to the first plane, wherein the first plane overlays the second plane, and wherein the first plurality of antenna elements have physical dimensions that match physical dimensions of the second plurality of antenna elements; and at least one separation layer placed between the first plane and the second plane, wherein the separation layer is comprised of a dielectric material, wherein the first plane and the second plane are concurrently powered on within a same operating frequency band wherein, based on a predetermined threshold, the second plurality of antenna elements is activated concurrently with the first plurality of antenna elements.

16. The system of claim 15, wherein at least a portion of antenna elements in the first plurality of antenna elements are connected to at least another portion of antenna elements in the first plurality to form one or more groups.

17. The system of claim 15, wherein the first plane is parallel to the second plane, and wherein the first plane overlays the second plane such that a position of at least one individual antenna element in the first plurality of antenna elements is arranged in the first plane to align with a position of at least one other corresponding individual antenna element in the second plurality of antenna elements arranged in the second plane.

* * * * *